United States Patent [19]

Blackman

[11] Patent Number: 5,255,408
[45] Date of Patent: Oct. 26, 1993

[54] PHOTOGRAPHIC FILM CLEANER

[75] Inventor: Robert J. Blackman, Rochester, N.Y.

[73] Assignee: Eastman Kodak Company, Rochester, N.Y.

[21] Appl. No.: 833,994

[22] Filed: Feb. 11, 1992

[51] Int. Cl.$^5$ .............................................. B08B 11/02
[52] U.S. Cl. ..................... 15/308; 15/309.1; 15/385
[58] Field of Search ................ 15/308, 309.1, 306.1, 15/385

[56] References Cited

U.S. PATENT DOCUMENTS

| | | | |
|---|---|---|---|
| 935,558 | 9/1909 | Spangler | 15/385 X |
| 935,559 | 9/1909 | Spangler | 15/385 X |
| 1,926,981 | 9/1933 | Gould | 15/308 X |
| 2,615,192 | 10/1952 | Morell | 15/385 X |
| 3,128,492 | 4/1964 | Hanscom et al. | 15/308 |
| 3,239,868 | 3/1966 | Di Vito | 15/246 |
| 3,470,576 | 10/1969 | Troia | 15/308 |
| 3,882,568 | 5/1975 | Hill | 15/308 |
| 3,937,573 | 2/1976 | Rising | 355/83 |
| 4,378,610 | 4/1983 | Ermer et al. | 15/1.5 R |
| 4,494,028 | 1/1985 | Brown | 310/156 |
| 4,706,325 | 11/1987 | Michelson | 15/308 |
| 4,774,551 | 9/1988 | Amos et al. | 355/68 |
| 4,786,946 | 11/1988 | Jessop | 355/28 |

*Primary Examiner*—Chris K. Moore
*Attorney, Agent, or Firm*—Joseph F. Breimayer; Marianne J. Trait; David A. Howley

[57] ABSTRACT

A cleaning device for removing dust particles and other impurities from the surface of data carriers such as photographic film. Two counter-rotating brushes sweep across the film surface to remove the impurities while air flows on either side of the film sweep away the impurities. The air flows are created by two counter-rotating fans, the armatures of which also rotate the brushes. The fans remove the need for a separate vacuum source. A slot facilitates the passage of the film through the brushes while a static eliminator removes charged particles from the film after it exits the brushes. The stiff brushes aid in overcoming static charges that may be on the film surface.

In a further embodiment only one of the two brushes is driven by a fan and the other brush rotates freely and is biased toward the driven brush.

24 Claims, 3 Drawing Sheets

PHOTOGRAPHIC FILM CLEANER

FIELD OF INVENTION

This invention relates to the removal of dust particles and other impurities from the surface of photographic film.

BACKGROUND OF THE INVENTION

The periodic cleaning of data carriers, such as photographic film, audio tapes and the like, is necessary for preventing the build up of impurities which inhibit the clarity and performance of the carrier. Employing brushes to dislodge the dust particles and other impurities is known in the art. Many of the present cleaning devices employing brushes, however, suffer from drawbacks. Rotating the brushes so that the particles are merely swept along the longitudinal direction of the film, as shown in U.S. Pat. No. 4,378,610, is inefficient because the impurities frequently will simply reposition themselves on a different portion of the film.

To increase the cleaning ability of the device, some cleaners create an air flow across the film surface to vacuum away the impurities after they have been dislodged by the brushes. This, however, requires a separate vacuum source which must be attached to the brushes. Such a system with an external air supply is shown in U.S. Pat. No. 3,470.576.

Some of the impurities can become electrically charged which makes them difficult to remove with the brushes. To alleviate this problem, prior art cleaning devices use an ionizer or static eliminator in addition to brushes to remove these particles. Such a system again requires additional components that must be added to the cleaning device.

A need exists, therefore, for a film cleaner that is efficient in removing various types of dust particles without requiring the addition of excessive external equipment.

SUMMARY OF THE INVENTION

The invention provides a cleaning device for removing impurities from the surface of film. In one embodiment, the cleaning device includes counter-rotating brushes for sweeping the impurities from the film surface. The brushes are attached to the armatures of the fans and correspondingly rotate when the fans are operated. The fans create an air flow on either side of the film for removing the particles after they become dislodged from the film. This arrangement removes the necessity of an external vacuum source.

The fans are encased in a housing for protection and a slot for guiding the film to the brushes is positioned between two housings. After exiting the brushes, a static eliminator helps to remove electrical charges that may remain on the film.

The brushes are generally circular in cross-section and their axis of rotation is substantially perpendicular to the plane of the film surface. As the film passes between the two rotating brushes, impurities are swept away and off of the film surface. Additionally, the stiffness of the brushes overcomes most of the static charge that may exist on the film surface.

In a further embodiment, only one of the two brushes is driven by a fan motor, and the other brush rotates freely and is biased toward the driven brush.

BRIEF DESCRIPTION OF THE DRAWINGS

These and other features and advantages of the present invention will become more apparent by reference to the following detailed description thereof in conjunction with the drawings, wherein.

DETAILED DESCRIPTION OF THE INVENTION

Figure 1:
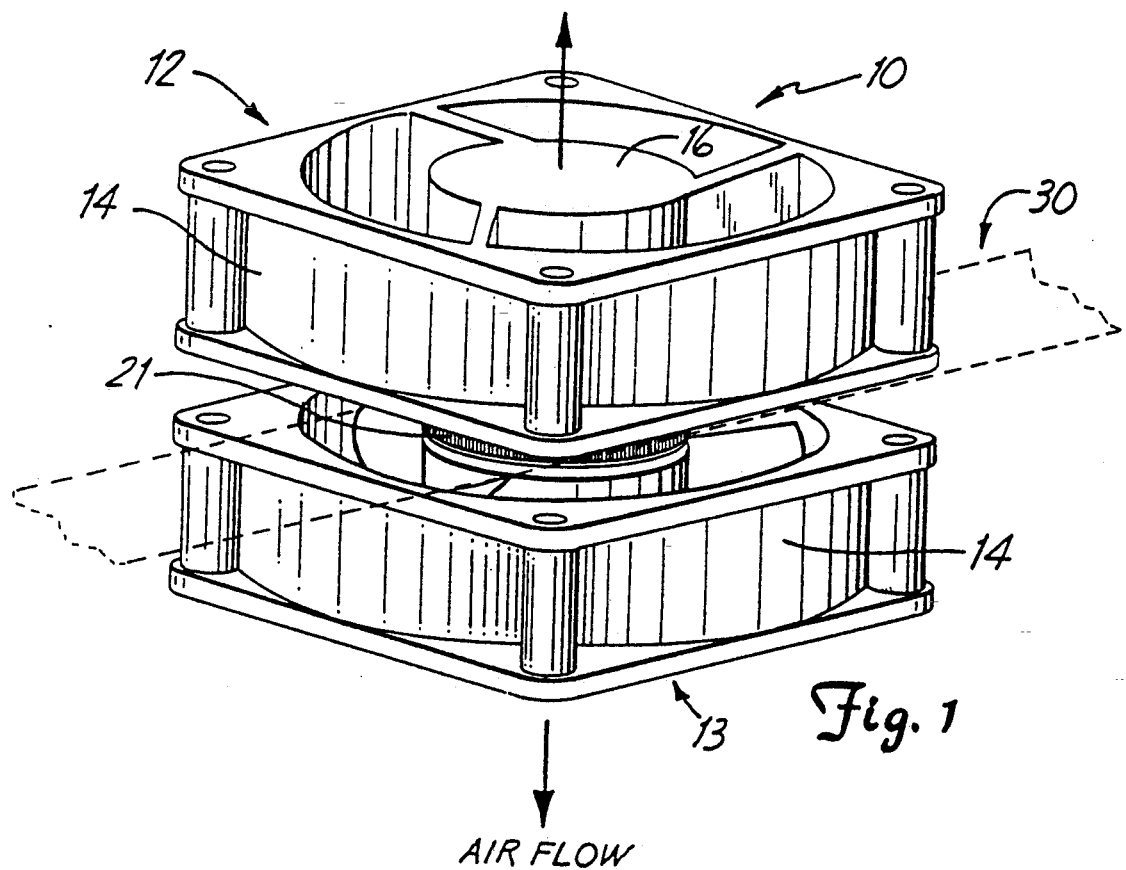
FIG. 1 is a perspective view of the cleaning device.

The present invention, generally designated 10 in FIG. 1, relates to a device for cleaning dust particles and other impurities from data carriers. Although described in the context of cleaning photographic film, the invention is equally adaptable for use in cleaning other articles such as audio/video tapes, soundtracks and the like.

In the preferred embodiment, fans 12 and 13 are used to both rotate the brushes 20 and 21 and create an air flow away from each side of the film 30 positioned therebetween to carry away dust particles. The fans 12, 13 can be oriented in a variety of ways so that the air flow created by the blades of the fans is directed at various angles with respect to the film 30.

Figure 2:
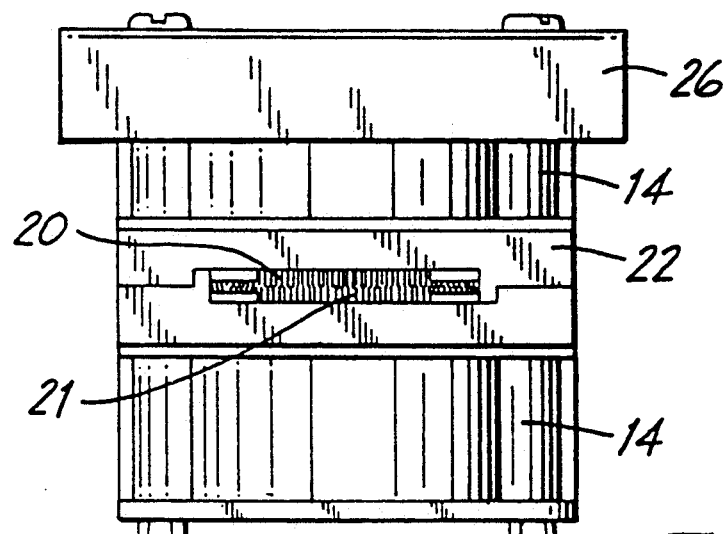
FIG. 2 is a side view of the cleaning device showing the slot which leads to the brushes.
Figure 3:
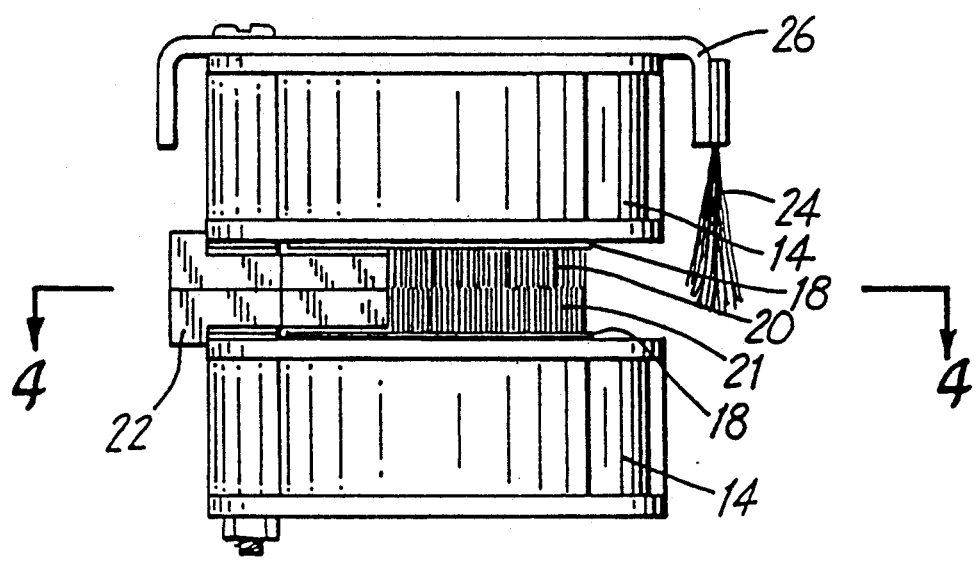
FIG. 3 is a side view of the cleaning device depicting the brushes, slot and sweeper.
Figure 4:
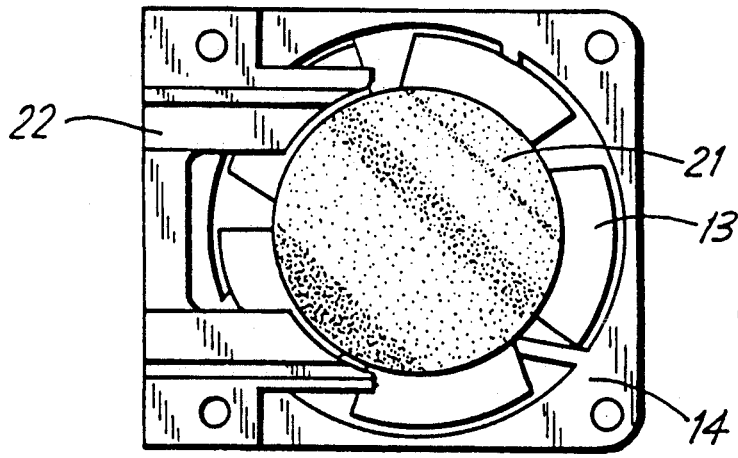
FIG. 4 is a cross-section view of the cleaning device along line 4—4 of FIG. 3 showing one of the brushes and fans.
Figure 5:
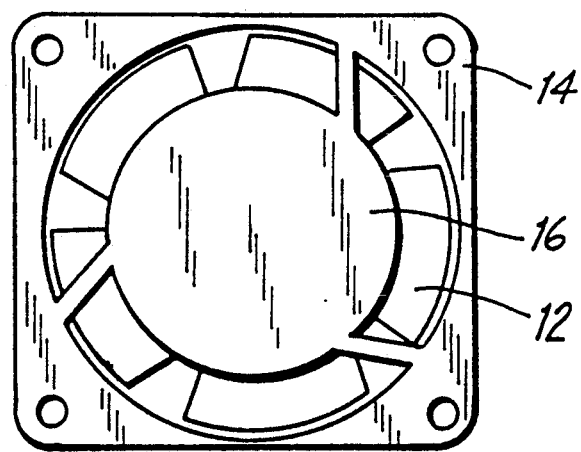
FIG. 5 is a top view of the cleaning device depicting one of the fans.

In the preferred embodiment, two substantially similar fans 12 and 13 are desirably oriented so that they generally oppose each other as shown in FIGS. 1-3, and the air flow created by their rotating blades is substantially perpendicular to and directed away from the plane of the film surface. Having the air flow directed away from the film 30 helps ensure that the particles cleaned are swept away from the film rather than towards it.

Each fan 12 and 13 is desirably encompassed by a housing 14. The motors 16 which operate the fans 12, 13 can also preferably be included inside the housings 14. The housings 14 serve as protection for the cleaning components as well as the operators and additionally, provides a frame to which other elements may be attached.

Each fan 12 and 13 desirably contains an armature 18 and 19, respectively, as shown in FIG. 3, connected to a flat circular surface which preferably faces toward the other fan. The brushes 20 and 21 are positioned on the flat surfaces of the armatures 18 and 19, respectively, so that their cleaning surfaces face one another and rotate in opposite directions.

The brushes 20 and 21 act upon the opposing surfaces of the film 30 by dislodging and sweeping away dust particles and other impurities when the film 30 is passed between them. A large variety of brushes 20 and 21, varying in both dimension and shape, may be used for contacting the film 30 surface. Additionally, the positions of the brushes may be varied so that different portions of the brushes contact opposite surfaces of the film 30. Since both surfaces of the film 30 are desired to be cleaned, the cleaning surface of the brushes should either overlap or a gap no wider than the thickness of the film 30 should exist between the brushes 20, 21.

After the film 30 is passed between the brushes 20, 21, their continued rotation relative to and against one another frees any dust particles. The freed particles are also vacuumed away by the fans 12, 13.

In the preferred embodiment, the brushes 20, 21 have a generally circular cross section of approximately 1.5 inch diameter. The cleaning surface of the brushes desirably slightly overlaps and approximately equal pressure is applied to both surfaces of the film 30 by the brushes 20, 21.

The brushes 20, 21 and the fans 12, 13 are rotated by the motor armatures 18, 19 about the same axis, but in opposite directions. Therefore, the same motors that rotate the fans 12, 13 to create an air flow, also rotate the brushes 20, 21 to produce the cleaning effect on the film 30 and on one another. The type of motor used and the speed at which the fans 12, 13 and the brushes 20, 21 rotate will largely be dependent upon the type of film to be cleaned and the nature of the particles to be removed. In the preferred embodiment, motors of the type FL 24A306 (DC 24V; 1.9W; 08A) manufactured by EG&G ROTRON (U.S. Pat. No. 4,494,028) are used to rotate the fans 12, 13 and the brushes 20, 21. Also in the preferred embodiment, most common impurities can be removed from the film by rotating the fans 12, 13 and the brushes 20, 21 at approximately 4,000 rotations per minute. Such a rotation produces a corresponding air flow of approximately 13 CFM for each fan.

The brushes 20, 21 should be made of a material capable of successfully dislodging impurities from the surface of the film 30 yet should also be pliant enough so as not to damage the film in the process. Additionally, static charges may be present around the film surface and attract dust particles thereby making them harder to dislodge from the film. The motion of the brushes 20, 21 across the film 30 can also sometimes create a static charge on the film surface. Stiff bristles on the brushes 20, 21 can prevent static charges from forming on the film 30 while it is being cleaned and also overcome any static charges that may have previously formed on the film surface. In the preferred embodiment, brushes 20, 21 with bristles no more than three-sixteenths of an inch in length are used to overcome the majority of any static charge that may exist. However, other brush materials and bristle lengths with the same relative stiffness and pile density may also be used providing they do not scratch film.

To facilitate the passage of the film 30 between the brushes 20, 21, a slot is desirably created by support member 22 and positioned in front of the brushes 20, 21 as shown in FIGS. 2 and 3. In the preferred embodiment, the member 22 is attached between the housings 14 at one of their outside edges and extends from just beyond the end of the housing 14 to the brushes 20. The slot in member 22 is desirably wide enough to allow the film 30 to pass through it but preferably has a minimum of excess space to ensure that the film 30 remains relatively constrained as it travels through the slot in member 22 and between the brushes 20, 21.

In the preferred embodiment, a sweeper 24 is placed at the end of the housing 14 opposite the slot in member 22 as shown in FIG. 3. The sweeper 24 is desirably made of a material capable of discharging static charges so that as the film 30 exits the brushes 20, 21, the sweeper 24 sweeps across one side of the film, and aids in the removal from the film 30 of any remaining static or charged particles. In the preferred embodiment, the sweeper 24 is constructed of strands of nylon pile.

Also in the preferred embodiment, a bracket 26 is attached to one of the housings 14. The bracket 26 can be used to attach the cleaning device 10 to other equipment such as film processing units. In the preferred embodiment, the sweeper 24 is attached to the bracket 26 and overhangs the exit area of the fans 12, 13 to contact the film 30 as it exits the brushes 20, 21.

In actual use, the motors can continuously operate the fans 12, 13 or operate them only when started in response to an external signal. The rotation of the fans 12, 13 creates an air flow on either side of the brushes 20, 21 and sets the brushes 20, 21 rotating in opposite directions from each other. Only one fan 12 or 13 can also be energized if only one side of the film 30 is desired to be exposed to the air flow. Similarly, employing fans of different sizes can create a stronger air flow on one side of the film 30.

In such use, the film 30 enters the cleaning device 10 through the slot in member 22. The film 30 is guided by the slot to the brushes 20, 21 where it passes between their rotating surfaces. As the film 30 passes between the brushes 20, 21, dust particles and other impurities are dislodged from the surface of the film 30 by the action of the brushes 20 sweeping across the film 30. The stiff bristles of the brushes 20 additionally act to overcome any static charge on the film 30 and remove particles attracted to the film surface by static charge. Once dislodged, the particles are carried away from the film 30 by the air flow created from the rotating fans 12, 13. The air flow, present on both sides of the film 30, helps ensure that the dislodged particles do not resettle on the film 30. After exiting the brushes 20, 21, the film 30 encounters the sweeper 24 which removes any residual charged particles that may remain on the film 30.

Figure 6:
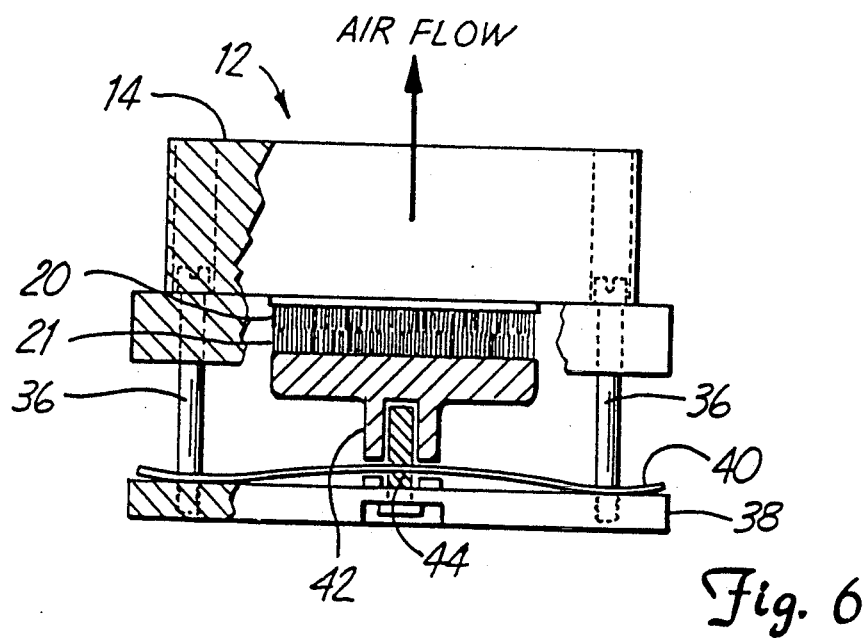
FIG. 6 is a side view in partial cut-away and cross-section of a further embodiment of the cleaning device employing a single motor driven brush and a free rotating brush.

In a further preferred embodiment of the invention depicted in FIG. 6, only one fan 12, mounted in its housing 14 and by its armature 18 to a brush 20, is employed in conjunction with a non-motorized spring-biased brush 21 so that the two brushes bear against the opposite surfaces of the film 30. In this embodiment, the spring-biased, freely rotating brush 21 is rotated in the same direction as brush 20 by the motor driven fan 12 acting in the intermeshed bristles of the brushes 20, 21. However, when the film 30 is advanced therebetween, brush 21 tends to slow or stop after initially tending to pull the film 30 into the slot in member 22. In this embodiment, it is desirable to provide an adjustable set-screw mechanism to adjust the space between the brushes 20, 21. Moreover, it may be desirable to employ brush bristle densities that differ between the two brushes or to use a relatively flat but soft surface in the place of brush 21.

In FIG. 6, the fan 12 is located in housing 14 as in the preceding embodiment to present the brush 20 in the slot formed in member 22. The bolts 36, 36' extend through the diagonally opposed corners of the housing 14 and screw into the back plate 38 for the spring loaded brush 21. The elongated, flat leaf spring 40, having a relatively low spring rate, bears against the brush holder 42 which rotates freely in its axle 44 that extends through the center of the square back plate 38. The spring 40 thus bears against back plate 38 and the brush holder 42 to bias brush 21 toward brush 20. The extent of the pressure applied to the surfaces of the film 30 between brushes 20, 21 can be adjusted by changing the spring rate of the spring 40.

Thus, in this embodiment only one fan 12 is employed to blow dust particles away from one surface of the film which may be acceptable in certain circumstances. Again, when the film is withdrawn after cleaning, residual dust particles are released from the brushes 20, 21 by their action on one another. The released particles are pulled away by the fan 12.

The film cleaner of the present invention allows film to be cleaned in several environments. In one environment, the cleaner is employed as a stand-alone unit that can be used in conjunction with a photographic printer such as a KODAK ® CREATE-A-PRINT. In this embodiment, the user can clean a negative or film strip by manually running it through the slot in member 22 of the present invention. The film is then manually inserted into the printing station.

In another environment, the present invention can be mounted in the film advancing path of an automatic photographic printer such as a KODAK ® CLAS 35 printer. The present invention can thus be used to remove dust and impurities from the negative strip before it enters the exposure station.

While a preferred embodiment of the present invention has been described, it should be understood that various changes, adaptations and modifications may be made therein without departing from the spirit of the invention and the scope of the appended claims.

What is claimed is:

1. A photographic film cleaner having an aperture for receiving a length of film having first and second planar image retaining surfaces and apparatus for cleaning dust particles from said first and second planar image retaining surfaces of the film passed through the aperture and further comprising:
   first and second rotatable brushes for sweeping the first and second planar film surfaces, respectively, each of the first and second rotatable brushes having an axis of rotation generally perpendicular to the first and second planar surfaces;
   rotating means for rotating the first and second brushes; and
   first and second fan means coupled to said rotating means and rotatable with said first and second rotatable brushes, respectively, for creating first and second respective air flows away from the first and second brushes, respectively, for drawing away dust particles cleaned by said first and second rotatable brushes from said first and second planar image retaining surfaces of the film.

2. The cleaner of claim 1 wherein:
   said rotating means further comprises first and second motors having first and second motor driven shafts;
   said first rotatable brush and said first fan means are mounted to said first motor driven shaft; and
   said second rotatable brush and said second fan means are mounted to said second motor driven shaft.

3. The cleaner of claim 2 wherein said first and second motor driven shafts are counter-rotated with respect to each other by said first and second motors, respectively, so that said first and second brushes rotate in opposite directions with respect to each other.

4. The cleaner of claim 2 further comprising:
   a first housing for retaining said first motor and for shrouding said first fan means and for presenting said first rotatable brush in a position to contact said first planar image retaining surface of the film;
   a second housing for retaining said second motor and for shrouding said second fan means and for presenting said second rotatable brush in a position to contact said second planar image retaining surface of the film; and
   means for defining said aperture and for mounting said first and second housings so that said first and second rotatable brushes are positioned to contact said first and second planar information retaining surfaces, respectively, of the film passed through said aperture.

5. The cleaner of claim 4 wherein said first and second motor driven shafts are counter-rotated with respect to each other by said first and second motors, respectively, so that said first and second brushes rotate in opposite directions with respect to each other.

6. The cleaner of claim 4 further comprising static eliminating means for substantially eliminating any electrical charge on the film, wherein the static eliminating means comprises a sweeper mounted to one of said first and second housings for contacting the film passed through said aperture.

7. The cleaner of claim 1 wherein said first and second brushes have planar bristle bearing surfaces that are generally circular.

8. The cleaner of claim 1 further comprising static eliminating means for substantially eliminating any electrical charge on the film, wherein the static eliminating means comprises a sweeper mounted to contact the film passed through said aperture.

9. A photographic film cleaner having an aperture for receiving a length of film having first and second planar image retaining surfaces and apparatus for cleaning dust particles from said first and second planar image retaining surfaces of the film passed through the aperture and further comprising:
   first and second rotatable brushes for sweeping the first and second planar film surfaces, respectively, each of the first and second rotatable brushes having a circular, planar surface from which brush bristles extend and an axis of rotation;
   means for mounting said first and second rotatable brushes for rotation about their axes so that the brush bristles on the bristle bearing planar surfaces thereof are in mutual opposed, overlapping contact and define a cleaning gap therebetween;
   rotating means for rotating at least the first brush about its axis; and
   fan means coupled to said rotating means and rotatable with said first brush, respectively, for creating an air flow away from the first and second brushes, respectively, for drawing away dust particles cleaned by said first and second rotatable brushes from said first and second planar image retaining surfaces of the film when film is introduced into said aperture and drawn through said gap therebetween.

10. The cleaner of claim 9 wherein said rotating means further comprises a motor having a motor driven shaft and wherein said first rotatable brush and said fan means are mounted to said motor driven shaft.

11. The cleaner of claim 10 wherein said mounting means further comprises a housing for retaining said motor and for shrouding said fan means and for presenting said first rotatable brush in a position enabling the bristles thereof to contact said first planar image retaining surface of the film, where present in said gap, and to contact the bristles of said second rotatable brush where the film is not present in said gap.

12. The cleaner of claim 11 further comprising static eliminating means for substantially eliminating any electrical charge on the film, wherein the static eliminating means comprises a sweeper attached to said mounting means for contacting the film passed through said aperture.

13. The cleaner of claim 9 further comprising static eliminating means for substantially eliminating any electrical charge on the film, wherein the static eliminating means comprises a sweeper attached to said mounting means for contacting the film passed through said aperture.

14. The cleaner of claim 9 wherein:
said rotating means further comprises first and second motors having respective first and second motor driven shafts and wherein said first rotatable brush and said fan means are mounted to said first motor driven shaft; and
said fan means further comprises further fan means mounted to said second motor driven shaft and rotatable with said second brush, respectively, for creating an air flow away from the first and second brushes, respectively, for drawing away dust particles cleaned by said first and second rotatable brushes from said first and second planar image retaining surfaces of the film when film is introduced into said aperture and drawn through said gap therebetween.

15. The cleaner of claim 14 wherein said first and second motor driven shafts are counter-rotated with respect to each other by said first and second motors, respectively, so that said first and second brushes rotate in opposite directions with respect to each other.

16. The cleaner of claim 14 further comprising static eliminating means for substantially eliminating any electrical charge on the film, wherein the static eliminating means comprises a sweeper attached to said mounting means for contacting the film passed through said aperture.

17. Apparatus for cleaning at least one surface of an elongated data carrier having first and second planar surfaces, said apparatus having an aperture for receiving the elongated data carrier and further comprising:
first and second rotatable brushes for sweeping the first and second planar surfaces, respectively, each of the first and second rotatable brushes having a circular, planar surface from which brush bristles extend and an axis of rotation;
means for mounting said first and second rotatable brushes for rotation about their axes so that the brush bristles on the bristle bearing planar surfaces thereof are in mutual opposed, overlapping contact and define a cleaning gap therebetween;
rotating means for rotating at least the first brush about its axis; and
fan means coupled to said rotating means and rotatable with said first brush, respectively, for creating an air flow away from the first and second brushes, respectively, for drawing away dust particles cleaned by said first and second rotatable brushes from said first and second planar surfaces of the data carrier when the data carrier is introduced into said aperture and drawn through said gap therebetween.

18. The cleaner of claim 17 wherein said rotating means further comprises a motor having a motor driven shaft and wherein said first rotatable brush and said fan means are mounted to said motor driven shaft.

19. The cleaner of claim 18 wherein said mounting means further comprises a housing for retaining said motor and for shrouding said fan means and for presenting said first rotatable brush in a position enabling the bristles thereof to contact said first planar surface of the data carrier, where present in said gap, and to contact the bristles of said second rotatable brush where the data carrier is not present in said gap.

20. The cleaner of claim 19 further comprising static eliminating means for substantially eliminating any electrical charge on the data carrier, wherein the static eliminating means comprises a sweeper attached to said mounting means for contacting the data carrier passed through said aperture.

21. The cleaner of claim 17 further comprising static eliminating means for substantially eliminating any electrical charge on the data carrier, wherein the static eliminating means comprises a sweeper attached to said mounting means for contacting the data carrier passed through said aperture.

22. The cleaner of claim 17 wherein:
said rotating means further comprises first and second motors having respective first and second motor driven shafts and wherein said first rotatable brush and said fan means are mounted to said first motor driven shaft; and
said fan means further comprises further fan means mounted to said second motor driven shaft and rotatable with said second brush, respectively, for creating an air flow away from the first and second brushes, respectively, for drawing away dust particles cleaned by said first and second rotatable brushes from said first and second planar surfaces of the data carrier when the data carrier is introduced into said aperture and drawn through said gap therebetween.

23. The cleaner of claim 22 wherein said first and second motor driven shafts are counter-rotated with respect to each other by said first and second motors, respectively, so that said first and second brushes rotate in opposite directions with respect to each other.

24. The cleaner of claim 22 further comprising static eliminating means for substantially eliminating any electrical charge on the data carrier, wherein the static eliminating means comprises a sweeper attached to said mounting means for contacting the data carrier passed through said aperture.

* * * * *